United States Patent
Sandu et al.

(10) Patent No.: US 11,763,086 B1
(45) Date of Patent: Sep. 19, 2023

(54) ANOMALY DETECTION IN TEXT

(71) Applicant: Amazon Technologies, Inc., Seattle, WA (US)

(72) Inventors: Ionut Catalin Sandu, Bucharest (RO); Alin-Ionut Popa, Bucharest (RO); Daniel Voinea, Vladiceasca (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 142 days.

(21) Appl. No.: 17/215,793

(22) Filed: Mar. 29, 2021

(51) Int. Cl.
  *G06F 40/295* (2020.01)
  *G06Q 30/0601* (2023.01)
  *G06Q 30/018* (2023.01)
  *G06F 40/216* (2020.01)
  *G06V 20/62* (2022.01)

(52) U.S. Cl.
  CPC .......... *G06F 40/295* (2020.01); *G06F 40/216* (2020.01); *G06Q 30/018* (2013.01); *G06Q 30/0627* (2013.01); *G06V 20/62* (2022.01)

(58) Field of Classification Search
  CPC ... G06F 40/295; G06F 40/216; G06Q 30/018; G06Q 30/0627; G06V 20/62; G06V 30/333; G06V 30/347; G06V 30/414; G06V 10/82; G06N 3/02; G06N 3/08
  See application file for complete search history.

(56) References Cited

U.S. PATENT DOCUMENTS

| | | | |
|---|---|---|---|
| 2017/0132528 A1* | 5/2017 | Aslan | G06N 20/00 |
| 2020/0029084 A1* | 1/2020 | Wierstra | G06N 3/0472 |
| 2020/0372339 A1* | 11/2020 | Che | G06N 3/0472 |
| 2021/0326728 A1* | 10/2021 | Kawachi | G06N 3/088 |
| 2022/0101144 A1* | 3/2022 | Vahdat | G06N 3/088 |
| 2022/0198266 A1* | 6/2022 | Chakraborty | G06N 3/0472 |

OTHER PUBLICATIONS

Upchurch, Paul, et al. "From A to Z: supervised transfer of style and content using deep neural network generators." arXiv preprint arXiv:1603.02003 (2016) pp. 1-11 (Year: 2016).*
Baker, Reed, The Global Status of Food Allergen Labeling Laws, 54 Cal. W. L. Rev. 293 (2018) (Year: 2018).*
Li, Yang, et al. "Disentangled variational auto-encoder for semi-supervised learning." Information Sciences 482 (2019), pp. 73-85 (Year: 2019).*

(Continued)

*Primary Examiner* — Jesse S Pullias
*Assistant Examiner* — Michael C. Lee
(74) *Attorney, Agent, or Firm* — K&L Gates LLP

(57) ABSTRACT

Systems and techniques are generally described for anomaly detection in text. In some examples, text data comprising a plurality of words may be received. An image of a first word of the plurality of words may be generated. A feature representation of the first word may be generated using a variational autoencoder. A score may be generated based at least in part on the feature representation. In various examples, the score may indicate a likelihood that an appearance of the first word in the image of the first word is anomalous with respect to at least some other words of the plurality of words.

18 Claims, 8 Drawing Sheets

(56) References Cited

OTHER PUBLICATIONS

Roy, Prasun, et al. "STEFANN: Scene Text Editor Using Font Adaptive Neural Network." 2020 IEEE/CVF Conference on Computer Vision and Pattern Recognition (CVPR). IEEE, 2020, pp. 13225-13234 (Year: 2020).*

Schorr, Christian. "Hybrid consistency and plausibility verification of product data according to FIC." arXiv preprint arXiv:2102.02665 (Feb. 3, 2021) pp. 1-41 (Year: 2021).*

Akçay, Samet, et al. "Skip-ganomaly: Skip connected and adversarially trained encoder-decoder anomaly detection." 2019 International Joint Conference on Neural Networks (IJCNN). IEEE, 2019, pp. 1-8 (Year: 2019).*

* cited by examiner

ANOMALY DETECTION IN TEXT

BACKGROUND

The font of a body of printed text may be altered within the body of text for various purposes. For example, italics, bolding, underlining, changing of typeface, etc., may be used to provide emphasis and/or to draw the reader's attention to particular parts of the text. In an example, a label of a food product may have allergens (peanuts, milk, soy, wheat, etc.) depicted in bold among other non-bolded ingredients in order to draw the reader's attention to such terms. Similarly, the description of an item for sale in an online catalog may also use different fonts to highlight certain ingredients or aspects of the item.

DETAILED DESCRIPTION

Figure 1A:
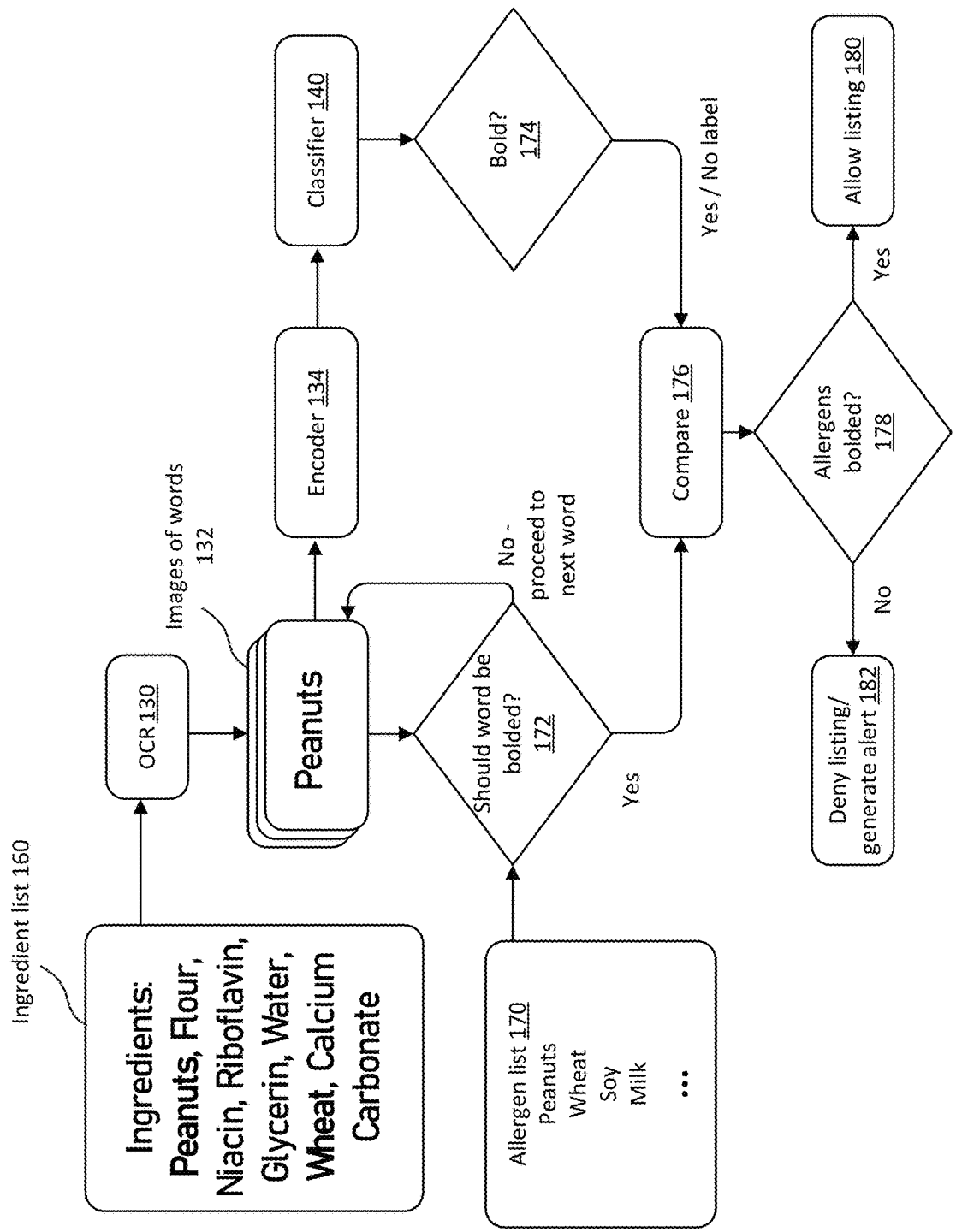
FIG. 1A is a block diagram depicting an example system for automatically validating food labels, in accordance with various aspects of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

E-commerce services may offer products from a variety of different third party sellers. In some examples, the products may be required to conform to various regulatory requirements. For example, food products and/or other ingestible products sold within the United States (and/or within other nations) may be required by regulatory bodies to display an ingredient list. Further, in some examples, ingredients that are known allergens (e.g., ingredients identified by the regulatory body as allergens) may be required to be bolded and/or otherwise emphasized within the ingredient list. For example, a soup containing water, carrots, onions, milk, and garlic may be required to bold the term "milk" or otherwise emphasize the term "milk," as milk is identified by the United States Food and Drug Administration (FDA) as an allergen.

Although many examples described herein are related to detecting bolded or otherwise emphasized words in food products and/or ingestible products, the systems and techniques described herein may be used to detect anomalous text in any context. However, for ease of illustration, the examples provided herein typically use the example of ingredient and/or component lists.

The systems and techniques described herein are configured to automatically detect words having anomalous appearance within a body of input text. "Anomalous," in this context, refers to words depicted in a font that differs from the font of at least some other words within the body of input text. The font may differ in variety of ways, such as, e.g., in size, weight, style, and typeface. For example, in the following list: "Water, Carrots, Onions, Red Lentils (4.5%) Potatoes, Cauliflower, Leeks, Peas, Cornflower, Wheat, Cream (milk), Peanuts, Sunflower Oil" the terms "Wheat," "milk," and "Peanuts" may be anomalous as these terms are either bolded (in the case of "Wheat" and "milk") or are both bolded and italicized (e.g., "Peanuts"). The frequency of bolded and/or italicized words is uncommon within the input list, as the majority of the words are not bolded or italicized. Thus, these words may be anomalous with respect to at least some of the other words within the text.

Various techniques described herein are effective to determine anomalous text in terms of the appearance of the text (e.g., the appearance of the font) relative to the rest of the input text. The "anomaly" described herein does not refer to the semantic meaning of text with respect to other text, but rather the graphical depiction of the text. Although detecting such anomalous text is an easy task for human visual acuity, development of an automated system that can detect anomalous text is non-trivial. For one, heuristic systems may fail as the relative appearance of text may vary from one corpus of input text to another. Thus, detecting bolded words (or other anomalous words) may not be keyed on the size and/or thickness of the font, since fonts use different thicknesses. Further, many machine learning language models may be prone to overfitting on training data and may learn features that semantically represent the text rather than focusing on the appearance of the text. Further, object detection methodologies may have similar issues as the heuristic-based approaches mentioned above, where the object detector may base decision making on the size and/or thickness of the font and/or otherwise may have issues with overfitting on the training data.

Accordingly, use of rule-based systems and/or traditional "off-the-shelf" machine learning models may be insufficient for the task of anomaly detection in text. Accordingly, in various examples described herein, specialized machine learning-based approaches may be employed for anomaly detection in text. For example, the various systems described herein may leverage Deep Neural Networks, regression models, etc.

Machine learning techniques, such as those described herein, are often used to form predictions, solve problems, recognize objects in image data for classification, similarity determination, etc. For example, herein machine learning techniques may be used to determine similarities between images associated with items and images associated with brands. Further, herein machine learning techniques may be used to determine similarity between text associated with items and text associated with brands. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation. Generally, in machine learning, an embedding is a mapping of a discrete, categorical variable to a vector of continuous numbers.

In various examples, the systems and techniques described herein may take an image that includes text (e.g., an image of a food product label) as input. An optical character recognition (OCR) technique is then used to separate the image of the text into a set of images of each word of the text (e.g., each image of the set is an image of an individual word from the text). A multi-task learning approach is used that comprises 1) a variational autoencoder (VAE) used to generate a latent representation of the text attributes, and 2) a classifier (e.g., a sigmoid classifier or other classifier network) for attribute classification (e.g., bold vs. non-bold, italicized vs. non-italicized, etc.) on the word-level images. The system is trained end-to-end for multi-task learning using a decoder network to minimize both classification loss and reconstruction loss. As described herein, the VAE may include some skip connections to the decoder in order to directly carry some information from the encoder to the decoder. The multi-task learning approach and the skip connections aid the VAE in learning embeddings that represent the visual appearance of the font, rather than semantic information, in order to reduce over-fitting and improve performance.

Further, for each of the word-level images, a score is output by the classifier (e.g., between 0 and 1). Accordingly, for the input body of text (e.g., from a product label), a set S of such scores is generated. Simple thresholding can be used to determine anomalous text, or a clustering strategy may be used (e.g., z-score) in order to detect outliers.

FIG. 1A is a block diagram depicting an example system for automatically validating food labels, in accordance with various aspects of the present disclosure. In various examples, an image of an ingredient list 160 (and/or other text data) may be input into optical character recognition (OCR) 130. OCR 130 may be used to identify the individual words in the body of text represented by the image of the ingredient list 160. Accordingly, individual images of words 132 may be generated. Words may be identified by the OCR 130 as groupings of characters separated from other groupings of characters by one or more spaces. For example, the OCR 130 may generate bounding box information that specifies the location of individual words within the ingredient list 160. The bounding box information may be used to generate images of individual words (e.g., images of words 132) from the image of the ingredient list 160.

In various examples described herein, a system 100 (FIG. 1B) may be used to automatically determine bolded and/or otherwise anomalous words from an image that represents a plurality of words. In various examples, the system 100 may include an encoder 134 and/or a classifier 140. These components are described in further detail below. In various examples, the encoder 134 and/or classifier 140 may be used to determine whether the input images of words 132 are bolded (action 174) or are otherwise anomalous with respect to the appearance of at least some other words in the ingredient list 160.

Additionally, an allergen list 170 may comprise a list of words (e.g., text data) that are required by an applicable law or regulation to be bolded when listed as part of an ingredient list for food. Accordingly, for a given word of the ingredient list, a determination may be made (action 172) whether the given word is on the allergen list 170 and therefore should be bolded when listed on an ingredient label (e.g., ingredient list 160). For example, text data representing the image of the ingredient list 160 may be generated using OCR 130. The individual words of the text data may be compared to the allergen list 170 to determine whether any of the words are known allergens.

At comparison step 176 a determination of whether an input word-level image (e.g., "Peanuts") is bolded may be compared to the determination (at action 172) of whether the word should be bolded due to the word being on allergen list 170. Accordingly, at action 178 a determination may be made to determine whether, for the input ingredient list 160, whether known allergens that are on allergen list 170 are bolded in the ingredient list. If all allergens are detected as being bolded (or otherwise emphasized as required by the applicable law(s)) a determination may be made at action 180 that the listing of a product that is associated with the ingredient list 160 (e.g., a product labeled with the ingredient list) may be allowed to be listed on an e-commerce site. Otherwise, if one or more allergens is not bolded, contravening an applicable law or regulation, the listing of the product may be denied, and/or an alert may be generated (at action 182) to inform the seller that one or more allergens is un-bolded and thereby violates an applicable food safety law or regulation. The automatic determination of whether an individual image of a word appears bolded or is otherwise anomalous with respect to other words in the input image of text is described in further detail below.

Figure 1B:
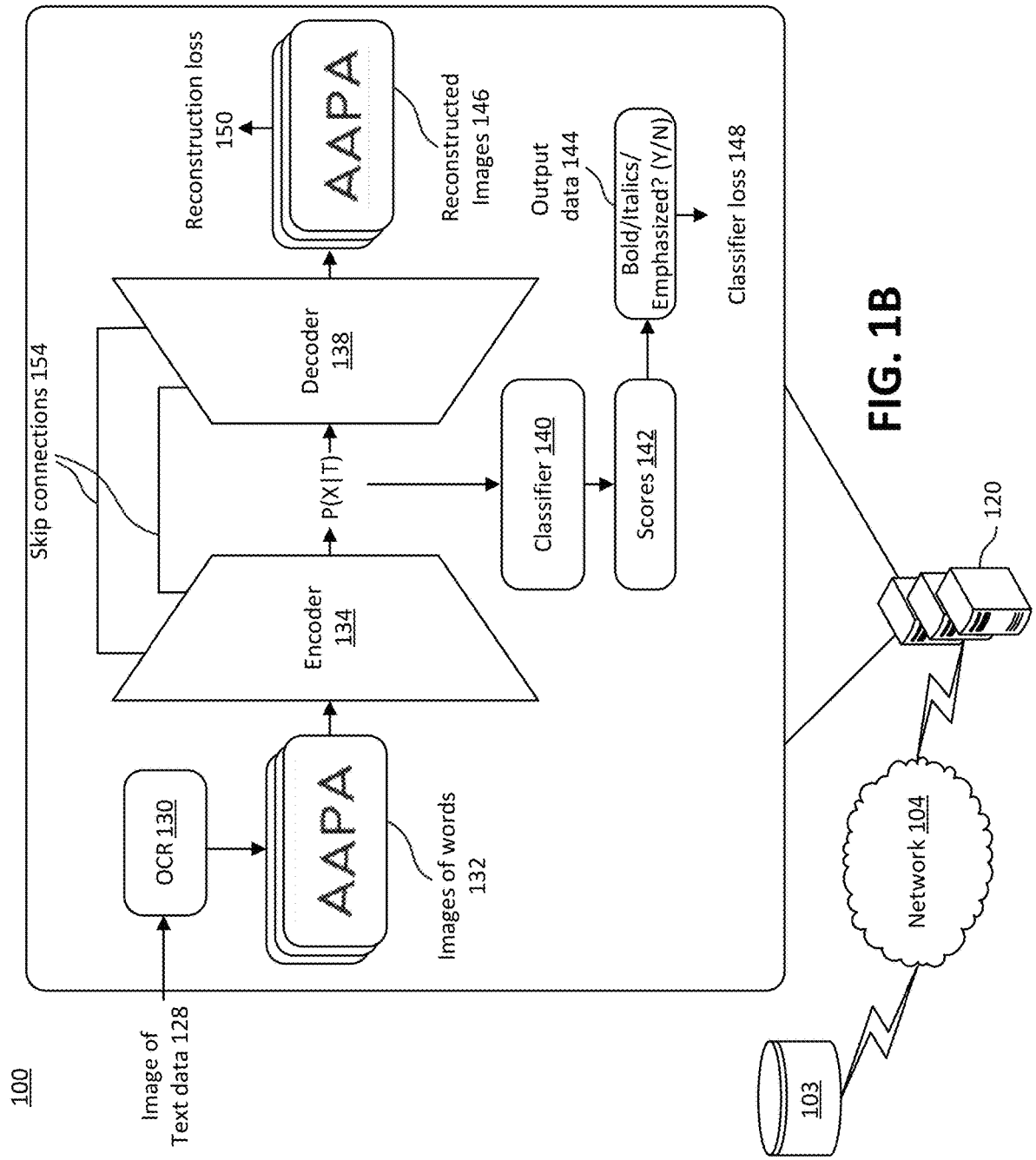
FIG. 1B is a block diagram depicting an example system effective to perform anomaly detection in text, according to various embodiments of the present disclosure.

FIG. 1B is a block diagram depicting an example system 100 effective to perform anomaly detection in text, according to various embodiments of the present disclosure. In various examples, one or more computing devices 120 may be used to implement the system 100 and/or the techniques described herein. Computing devices 120 may communicate with one another and/or with one or more of the other components depicted in FIG. 1B over a network 104 (e.g., a local area network (LAN) and/or a wide area network (WAN) such as the internet). For example, computing devices 120 may communicate with a non-transitory computer-readable memory 103 over network 104. In various examples, the non-transitory computer-readable memory 103 may store instructions that, when executed by at least one processor of the computing devices 120, may cause the computing devices to perform the various anomaly detection techniques described herein.

An image of text data 128 (e.g., a product label and/or any other image of a body of text) may be input into system 100. The system 100 may use OCR 130 to identify the individual words in the body of text represented by the image of text data 128. Accordingly, individual images of words 132 may be generated. Words may be identified by the OCR 130 as groupings of characters separated from other groupings of characters by one or more spaces. Accordingly, acronyms, such as the "AAPA" depicted in FIG. 1B may be detected as a word.

The images of words 132 may comprise two-dimensional pixel grids representing words from the image of text data 128. Each image of a word of the images of words 132 may be passed into encoder 134. Encoder 134 may be a VAE. In VAEs, encoders and decoders may be neural networks. The encoder encodes the input word image as a distribution over a latent space. The latent variable representation T is considered to have a standard Gaussian distribution P(T)=N(0, 1). The conditional distribution of the input word image X generated by the encoder 134 is also a Gaussian distribution with independent components (e.g., a diagonal covariance matrix). The conditional distribution (e.g., a feature representation of the input word image) is denoted as P(X|T). During training, the decoder 138 is a neural network that reconstructs the input image (e.g., generates reconstruction data) on the basis of P(X|T). The parameters of the encoder 134 and the decoder 138 are updated during training to minimize the reconstruction loss 150 (e.g., the quantified difference between the input image of the word and the corresponding reconstructed image (of reconstructed images 146).

Generally, VAEs are trained to provide regularization of the latent space to prevent over-fitting of the model to the training data. Instead of encoding the input as a single point, the input is encoded as a distribution over the latent space. Accordingly, during training, the encoder 134 encodes the input image of a word as a distribution P(X|T) over the latent space. A point from the latent space is sampled from the distribution P(X|T). The sampled point is decoded by the decoder 138 and the reconstruction loss 150 is computed. This reconstruction loss 150 may be back-propagated through the encoder/decoder network in order to update the parameters.

However, system 100 may be trained using multi-task learning. In particular, the classifier 140 may be trained end-to-end with the encoder 134 and decoder 138. The classifier 140 may take the mean parameter from the conditional distribution P(X|T) as input and may generate scores 142 indicating whether the current input corresponds to a particular class. The scores 142 may be used to determine anomaly in the text appearance. For example, a simple threshold may be used (e.g., scores over 0.8 may be classified as bold text) or statistical clustering-based method (e.g., FIG. 2, below) may be used to classify the text into output data 144 indicating whether or not the text corresponds to some anomalous class with respect to the body of text represented by the image of text data 128. Classifier loss 148 may be determined based on ground truth data (e.g., labels) of the training data (e.g., a binary label indicating bold or not bold, italicized or not italicized, etc.).

As described in further detail below in reference to FIG. 3, the encoder 134, decoder 138, and classifier 140 may be trained simultaneously by minimizing a weighted combination of reconstruction loss 150 and classifier loss 148. Skip connections 154 may persist information from layers of the encoder 134 to the decoder 138 to help prevent overfitting of the learned feature representation (e.g., P(X|T)) to the training data.

In various examples, there may be several classifiers 140 and/or classifier heads. The different classifiers 140 may each be trained to detect a different type of anomalous text. For example, a first classifier head may be trained to detect italicized text, a second classifier head may be trained to detect highlighted text, etc.

In an alternate embodiment, the system 100 may employ two encoders 134 - one for each class (e.g., bold/non-bold). A distance metric may be used for the latent representation. The two encoders 134 may employ weight sharing, in some examples. During training the multi-task training may leverage the label (bold/non-bold) together with the distance constraint. After training, the system 100 may use the distance metric to distinguish between the two classes for an input word.

In various examples, a feature that is proportional to the length of the word may be added. The size of the padding of a word (e.g., the horizontal spread of pixels of the characters of the word) may be computed relative to the image height (in pixels). This proportion increases as the word is longer. This number is used as a condition in the VAE and as input for the classifier. This feature may help to make the feature representations generated by the encoder 134 (P(X|T) independent of the length of the word. The latent representation should not capture information about the relative length of the word since it is not relevant to the classification task.

Figure 2:
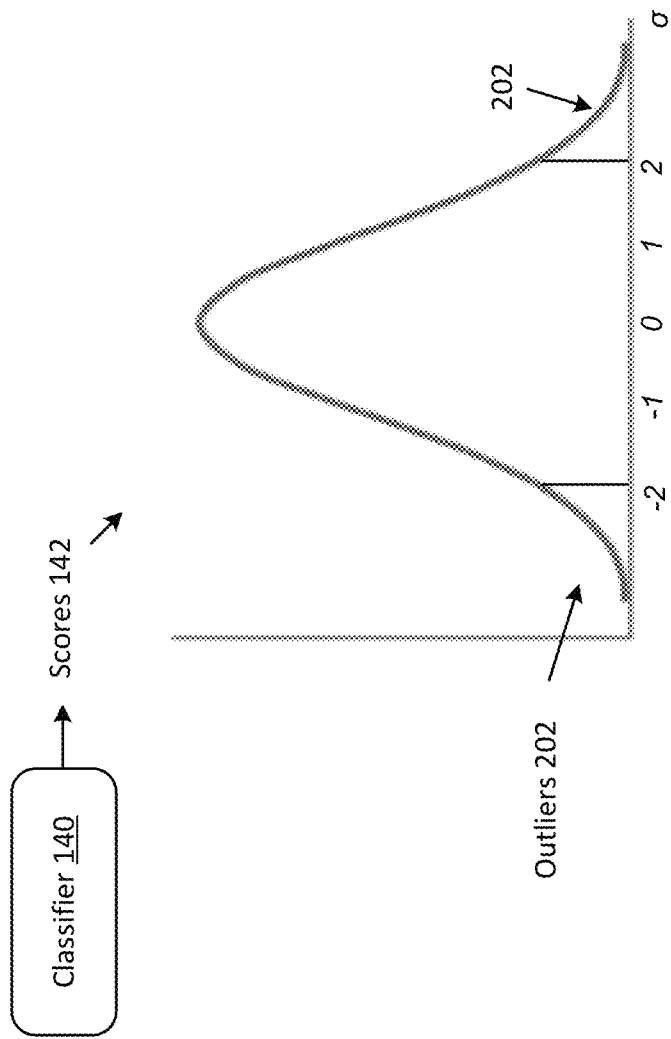
FIG. 2 depicts use of statistical techniques for anomaly detection in text, in accordance with various aspects of the present disclosure.

FIG. 2 depicts use of statistical techniques for anomaly detection in text, in accordance with various aspects of the present disclosure. In some examples, a static threshold may be used to determine whether the appearance of a word is anomalous with respect to the input body of text. For example, classifier 140 may output scores between 0 and 1. A threshold of 0.85 (or any other suitable value) may be used to distinguish between bolded and non-bolded text with words associated with scores over 0.85 being classified as bold and words associated with scores under 0.85 being classified as non-bold. This is merely an example, the actual threshold is implementation specific. For example, instead of the example implementation described above, bold words may be those words with classifier 140 scores under 0.5, over 0.5, and/or may be classified on the basis of either being over, equal to, or under any suitable value.

In some other examples, since font size, shape, and appearance may differ with respect to other font size, shape, and appearance, a cluster-based methodology may be used to classify the text as anomalous/non-anomalous on the basis of the scores 142 output by classifier 140. For example, the mean (e.g., the mean score) and standard deviation σ of the scores 142 may be determined and z-scores may be used as outliers to detect the anomalous text. In the example of FIG. 2 outliers 202 may be those scores 142 with σ≥2 (although different thresholds may be used in accordance with the desired implementation). Z scores may be given by:

$$Z = \frac{x - \mu}{\sigma}$$

where x is an individual score 142 and μ is the mean of scores 142.

Typically, the ingredients on a product label have the same font, size, color, background, etc., and only the allergens are bolded. In some examples, the font itself may be relatively thick (e.g., relative to other commonly used fonts). In such a case, a simple thresholding technique using a static threshold for system 100 may determine that all the words in such a label are bold since all words may have scores that exceed the static threshold. The outlier detection methodology (e.g., z-score) described above avoids such scenarios. In various examples, the subset of scores with a z-score that exceeds a pre-determined value (e.g., >2σ) may be determined to be anomalous with respect to at least some other words of the input text.

Figure 3:
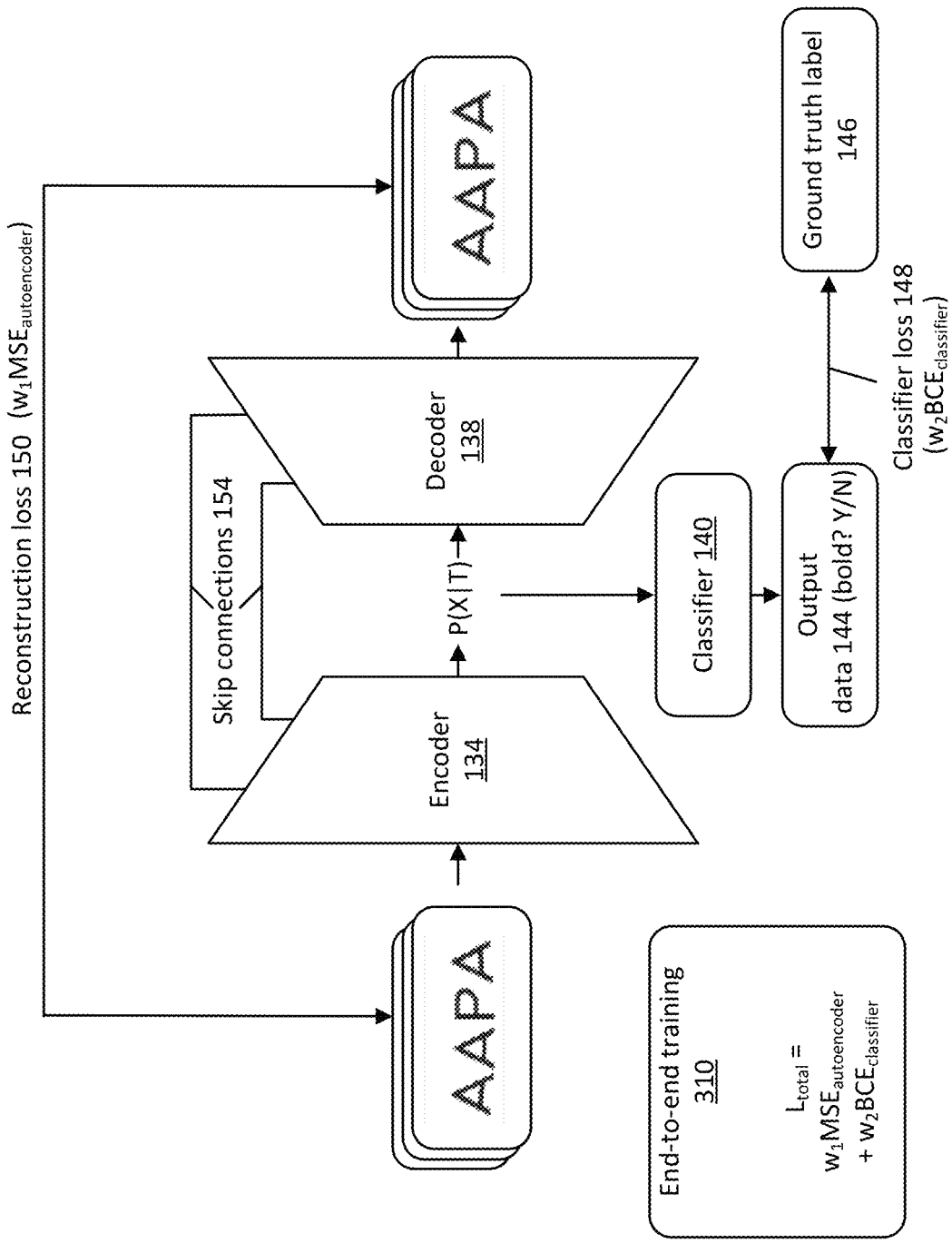
FIG. 3 depicts an example of training of an example system effective to perform anomaly detection in text, in accordance with various aspects of the present disclosure.

FIG. 3 depicts an example of training of an example system effective to perform anomaly detection in text, in accordance with various aspects of the present disclosure. As previously described, the encoder 134, decoder 138, and classifier 140 may be trained simultaneously using end-to-end training 310 based on a weighted sum of classifier loss 148 and reconstruction loss 150.

$$L_{total} = w_1 MSE_{autocoder} + w_2 BCE_{classifier}$$

where $w_1$, $w_2$ are scalar weights, $MSE_{autoencoder}$ is mean square error loss for the autoencoding task and $BCE_{classifier}$ is the binary cross entropy for the classification task. Using this multi-task training helps the encoder 134 to learn feature representations (e.g., condition distributions) that represent useful features of the input words for the text anomaly detection task and helps to prevent over-fitting to the training data. For example, using traditional classifiers and/or encoders, features may be learned that represent the semantic meaning of the word. Accordingly, the next time the same word is seen as a word that the network has learned is an anomaly, the network may classify the word as anomalous regardless of how the font of the word appears with respect to the body of text.

Figure 4:
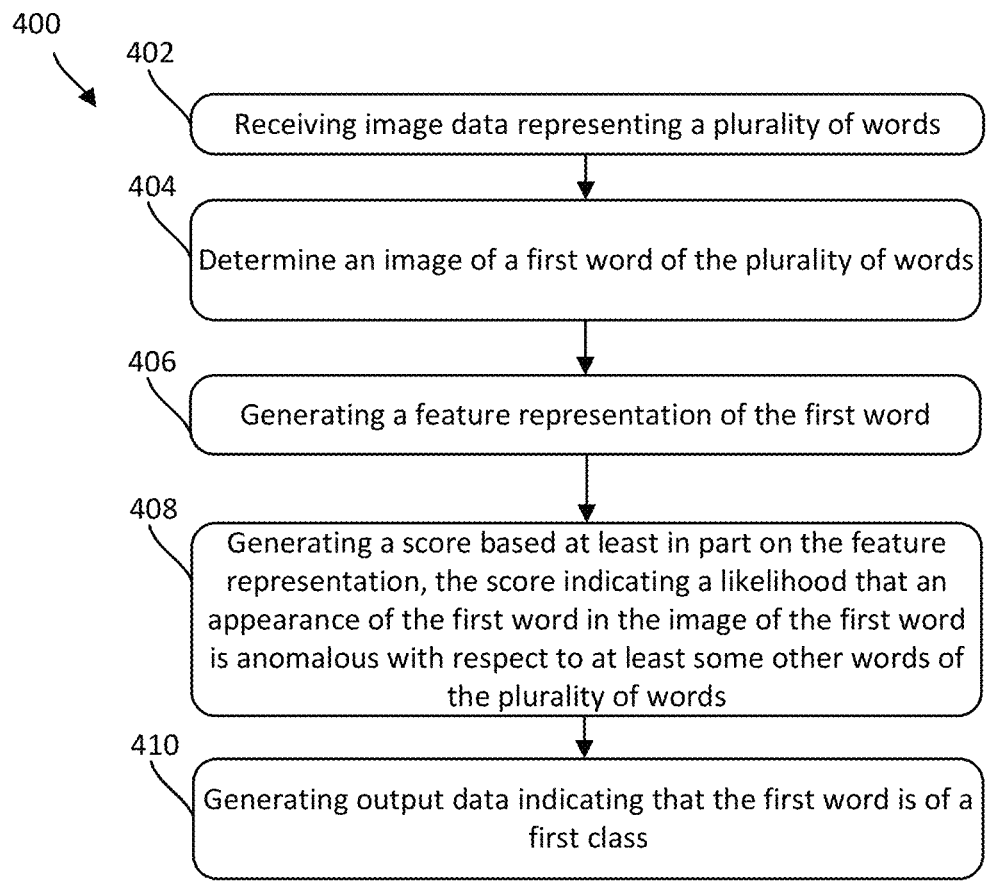
FIG. 4 depicts an example process that may be used to perform anomaly detection in text, in accordance with various aspects of the present disclosure.

FIG. 4 depicts an example process 400 that may be used to perform anomaly detection in text, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 402, at which first text data comprising a plurality of words may be received. In various examples, the first text data may be received as an image of text data (e.g., an image of a paragraph of text, an image of a product label, etc.).

Processing may continue at action 404, at which an image of a first word of the plurality of words may be detected. In various examples, the words of the plurality of words may be separated into images of individual words. As previously described, individual words of the body of words may be detected using OCR to separate the words on the basis of spaces between characters.

Processing may continue at action 406, at which a feature representation of the first word may be determined. In various examples, a VAE may be used to generate the feature representation. The feature representation may comprise a conditional distribution P(X|T) for the input word mapped to a latent distribution learned by the VAE during multi-task training. The mean parameter of the conditional distribution P(X|T) may be determined and/or a point from the conditional distribution P(X|T) may be sampled for input into a classifier.

Processing may continue at action 408, at which a score may be generated based at least in part on the feature representation. The score may indicate a likelihood (e.g., a probability) that an appearance of the first word in the image of the first word is anomalous with respect to at least some other words of the plurality of words. For example, a sigmoid classifier and/or other regression based classifier may be used to generate scores 142 which may, in turn, be used to classify the input word (e.g., the first word of the plurality of words) as either anomalous with respect to other words of the input text, or non-anomalous.

Processing may continue at action 410, at which output data indicating that the first word is of a first class may be generated. The output data may be a classification of the input word (e.g., the first word of action 404). Various techniques may be used to generate the output data that classifies the input word, as described herein. For example, a static threshold may be used and/or a clustering algorithm may be used to determine whether the score is an outlier. Accordingly, the score (and input word) may be classified on the basis of its z-score (or similar). For example, the classifier may be used to determine whether a word is bolded, italicized, highlighted, underlined, of a different font with respect to the other words of the input text, etc. Additionally, in some examples, multiple classifier heads may be used to detect various different types of anomalies in the input text (e.g., italics, boldness, etc.).

Figure 5:
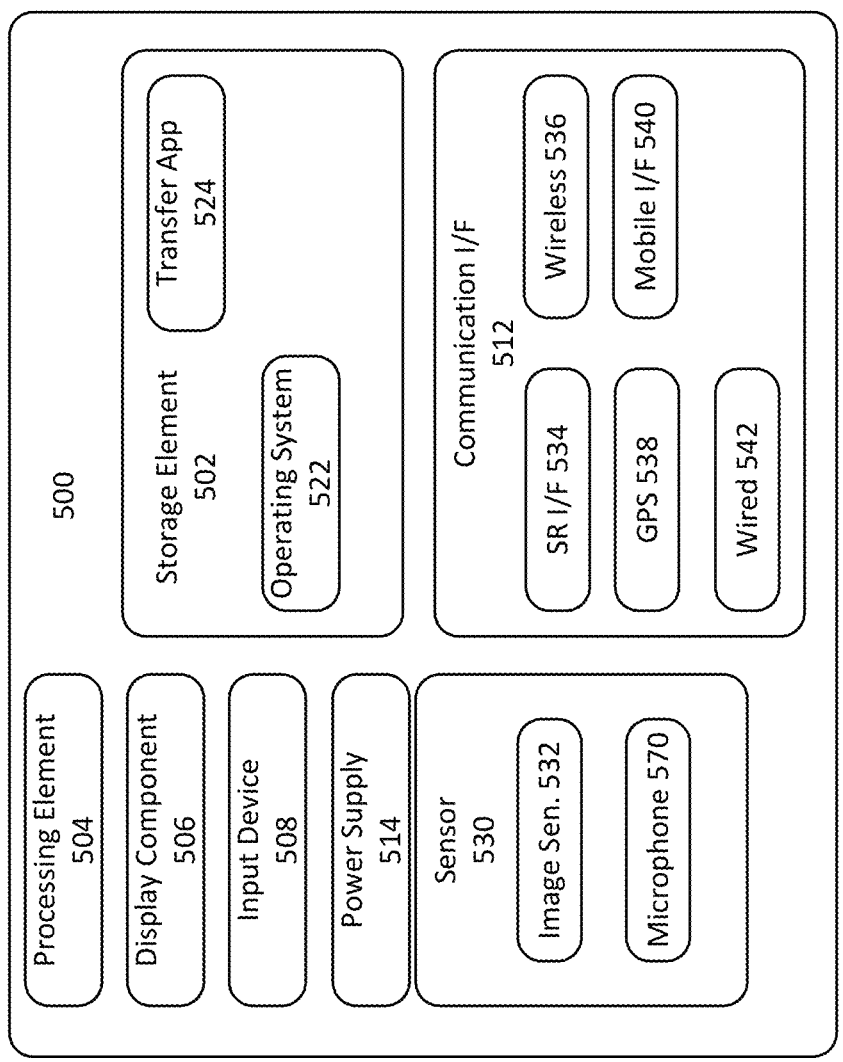
FIG. 5 is a block diagram showing an example architecture of a computing device that may be used in accordance with various aspects of the present disclosure.

FIG. 5 is a block diagram showing an example architecture 500 of a computing device that may be used to instantiate the text anomaly detection techniques described herein. For example, architecture 500 of a computing device may be effective to implement various machine learning models such as the VAEs, classifiers, etc., described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
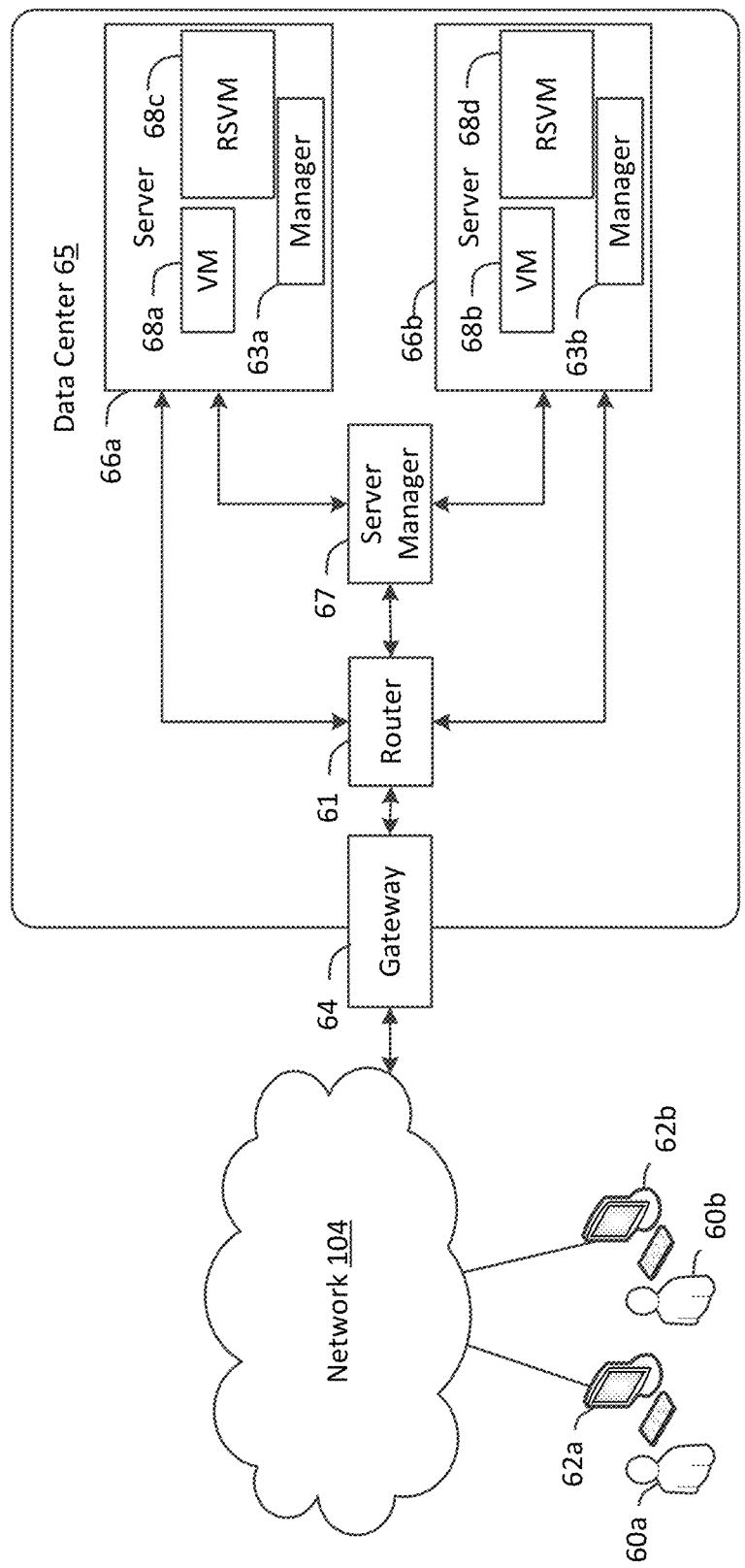
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols.

These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
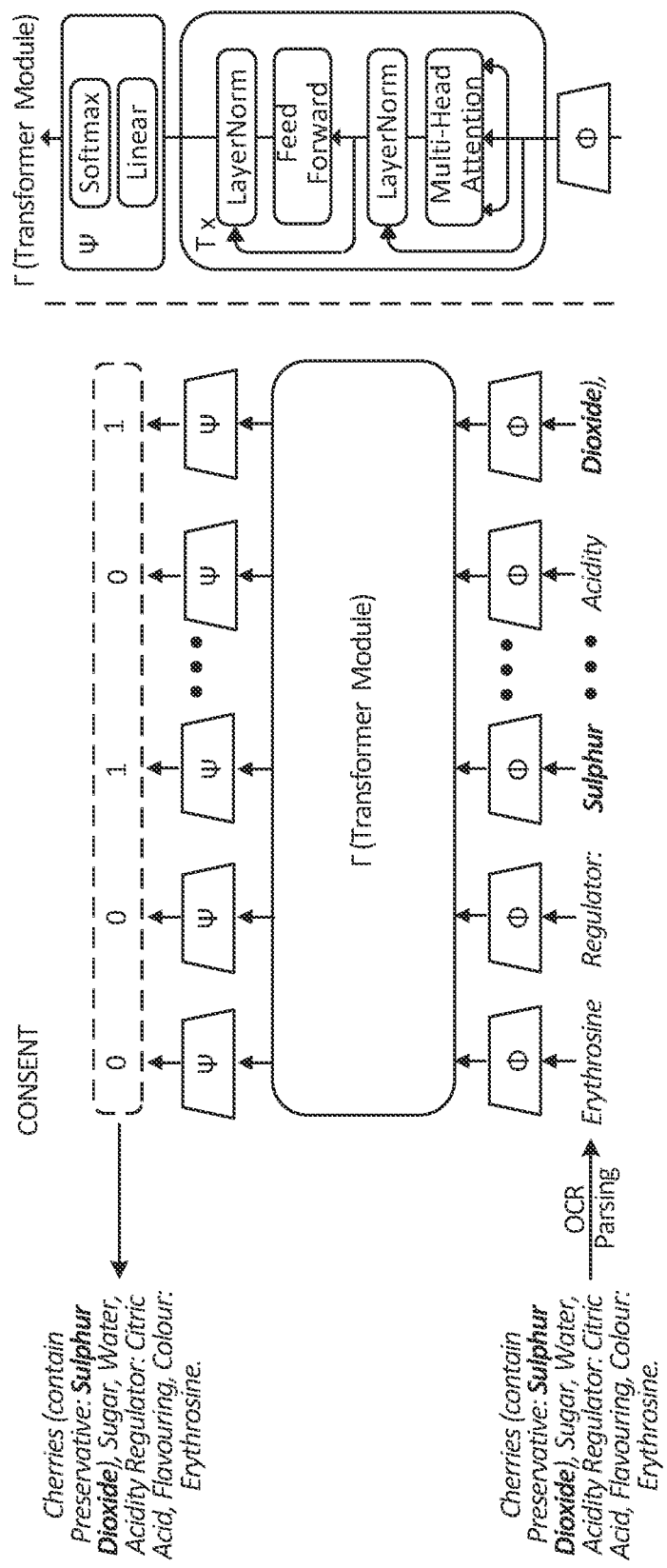
FIG. 7 is a block diagram illustrating another example system effective to perform anomaly detection in text, according to various aspects of the present disclosure.

FIG. 7 is a block diagram illustrating another example system 700 effective to perform anomaly detection in text, according to various aspects of the present disclosure. The system 700 can be summarized to include the following computational steps: given an image including text, (a) optical character recognition (OCR) system is performed to identify all the words, (b) group the extracted word-based image regions into sequences and pass them through the system comprising a ResNet18 backbone feature extractor (or other feature extractor), followed by a reasoning over the word types using a transformer head.

Transformers are often used in natural language processing tasks. Their core component is attention and this mechanism has been successful in natural language processing (NLP) tasks such as machine translation and has proved to be superior in leveraging context for sequence to sequence modelling.

Modern networks employ transformers-like architectures that account for information from different representational states, thus eliminating the bottle-neck effect caused by the usual encoding-decoding schemes. This consequence is mainly caused by the attempt to project the original input into a lower dimensional space. The compression due to encoding might cause important information loss since it is very difficult in practice to verify the assumption that the input data can be successfully projected into a fixed intermediate vector. In order to decide which piece of information is relevant with respect to the context of the input, an attention system is used.

In the system of FIG. 7, instead of directly linking attention to convolutional layers so that it taps into pixel information (or more generally instead of building custom encoders layers that should learn situational embeddings) a basic architecture is used only for learning a local statistic (e.g., differentiating between bold/non-bold words or learning other context dependent information). The convolutional neural network backbone learns to extract relevant features (e.g., letter thickness) which are then used for comparison. As follows, the transformer head does not need to utilize a large number of parameters and does not need to directly search for hints and focus on particular pieces of information. System 700 is modular and can be customized with any feature extractor in context dependent tasks where inputs need to be compared with each other.

In system 700, an image containing text is provided as input. First the bounding boxes containing words are extracted using an OCR component. Next, the word-level images are passed through a feature extractor $\Phi$ as a sequence to obtain specialized features for the bold versus non-bold problem. As described below, system 700 may be used to perform other context-dependent tasks—such as identifying deviation from proper exercise techniques, distinguishing players from referees in a soccer match (without prior knowledge of uniform disparities), etc. The obtained features are then passed through a transformer module $\Gamma$ which learns an implicit statistic between the elements of the sequence. Finally, the features are processed by a decoding module $\Psi$ to obtain the final class estimates for each word-level image patch.

Methodology

Given an image $I \in \mathbb{R}^{h \times w}$ text, the goal is to classify all the word-level image patches as either bold or non-bold. For this task, grayscale images are used, as the color component is invariant for the problem at hand. Due to the example implementation being a text-based type of problem, an OCR algorithm is used. Thus, we aimed to emphasize the importance of transformer head capabilities for the problem at hand, on top of a predefined pool of predictions. However, it can be used with any region proposal mechanism.

After applying the OCR algorithm, for image I a pool of N word-level image patches is generated. These N word-level image patches are denoted by $P=\{P_{i\in\{1 \ldots N\}} | P_i \in \mathbb{R}^{h_i \times w_i}\}$, where N is the number of words from image I. For each $P_i$ there is a corresponding binary label attached, marking it as either bold or non-bold. The attached array of labels is denoted by $L=\{0,1\}^N$. Thus, the training samples comprises pairs $(P_j, L_j)$ where $j=1 \ldots N_{images}$ and $N_{images}$ being the total number of data samples. For ease of notation and understanding, $P_j$ and $L_j$ are referred to as P and L, respectively.

For each word-level image patch $P_i \in P$, a simple foreground-background segmentation is applied to obtain the letter-level segmentation mask, denoted by $S_i$ with $i=1 \ldots N$. Basically, each pixel corresponding to background is 0 and each pixel corresponding to the letter content is 1. For each mask $S_i$, two morphological based operations are applied: (1) skeletonization of the foreground mask inspired denoted by $S_i^{skel}$ and (2) distance transform applied on the interior of the foreground mask denoted by $S_i^{dist}$. The intuition behind applying these two types of operations is that $S_i^{skel}$ should provide the inner most pixels with respect to the letter shape and $S_i^{dist}$ gives us the distance towards the closest edge of the letter for those pixels.

As a result, for each word, a thickness measurement is obtained in the form of $$\theta(P_i) = \{S_i^{dist}(x, y) | S_i^{skel}(x, y) = 1, i = 1 \ldots N\} \quad (1)$$

Basically, $\theta(P_i)$ provides a thickness measurement computed over all skeleton pixels of a word. If $\theta(P_i)$ is merged at the image level, a thickness measurement is obtained that is aggregated over the entire image I. This image measurement is denoted by $$\theta_I = \{\theta(P_i) | i = 1 \ldots N\} \quad (2)$$

Having a global thickness measurement over the image I, in the form of $\theta_I$, and the prior knowledge that $\approx 10\%$ of the words are bold, the following voting scheme is used to determine if a word is bold or not, $$B(P_i) = \begin{cases} 0 & \text{if } \mu(\theta(P_i)) > med(\theta_I) + \alpha \cdot \sigma(\theta_I) \\ 1 & \text{if } \mu(\theta(P_i)) \leq med(\theta_I) + \alpha \cdot \sigma(\theta_I) \end{cases} \quad (3)$$

(3) where $\mu(\cdot)$, $\sigma(\cdot)$ and med($\cdot$) represent the mean, the standard deviation and the median function respectively. Parameter a is a voting threshold value which requires validation.

Region-based Image Classifier

One other straight approach for this problem is by building a classifier model, where a training sample is considered as a word-level image patch, together with its corresponding binary label, $(P_j, L_j)$, independently of the image where it came from.

For this purpose, a word-level image-based model is constructed that disentangles the visual representation of the words into having a discriminative feature for the task of bold-versus non-bold image classification. A multi-task ensemble may be used as an approach to solving the problem:

A) a variational autoencoder (VAE) trained on letter-level image patches, which reconstructs an input image.

B) a classification head $\Omega$ placed on top of the VAE latent representation trained for the bold versus non-bold classification task.

The intuition behind this is that the VAE model should understand the appearance representation in terms of font-style and font-attributes of each word and the classification head to constrain it into specializing for the task of bold versus non-bold word detection.

For each of the word level images $P_j$ from an image I, a score between 0 and 1 is obtained using the $\Omega$ model. In order to obtain the bold words with respect to image I, two methods may be used: (1) select every word with a score above a certain threshold or (2) perform a clustering based strategy on the obtained scores using (z-score) statistics. As previously described, the second approach may be advantageous to account for accurate classification in the face of font/typeface differences. This is achieved by computing the mean and standard deviation followed by filtering out those scores which have the highest distance with respect to the mean of the set of scores. Basically, this acts as an outlier detector for those word level images which stand out with respect to the rest from I.

The main issue with this approach is that it learns to discriminate between word patches accross the entire dataset. However, given the observation from 2, this may be problematic and the model may become confused, thus assigning uncertain scores. That is why, it is important for this particular task to integrate the local-image context inside the learning task.

Context Sensitive Transformer

Given the previously defined sequence P of word patches, a model should learn their corresponding labelings L. This implies learning to distinguish between them locally, not globally. To accomplish this particular task, the proposed transformer model of system 700 incorporates three distinctive components (I, II and III):

(I): $\Phi$ is a convolutional network designed for classification which acts as a feature extractor. It maps a patch of words $P=\{P_i | i=\{1, \ldots, N\}\}$ to a sequence of embeddings $E=\{E_i | i=\{1, \ldots, N\}\}$. For this purpose, a light weight image classifier may be used. In various examples, the image classifier may be pre-trained on ImageNet (or some other dataset) and may be specialized for the desired use case. The reason behind this is that the model is looking only at crops of words and the goal is to determine low-level image feature discriminative for the task of bold versus non-bold word detection. In practice, the model complexity should be adjusted according to the task at hand. In an example implementation, the ResNet18 backbone network may be used as a featurizer. The last classification layer may be discarded and a 1×1 convolution may be added in order to match the output dimensionality of $\Phi$ to the input of the transformer module.

$$\Phi(P)=E \tag{4}$$

(II): $\Gamma$, a light transformer head that performs attention over the sequence of embeddings E and outputs another sequence $\hat{E}_T=\{\hat{E}_i^t | i=1, \ldots N : t=1 \ldots T\}$ as a result of applying attention. The transformer head may comprise T stacked encoding layers, where each encoding layer comprises multi-head attention, layer normalization, and feedforward layers together with some residual-block connections. In various examples, the positional encoding may be dropped if it is not relevant to the task at hand (e.g., the bold word versus non-bold word assignment is irrelevant to their image localization). It may be desirable to let the transformer account for every patch independently of its position and leverage their $\Phi(P)$ feature representation to learn an implicit statistic between the sequence elements with respect to binary classification given the local context.

$$\hat{E}_0=\Gamma(\Phi(P)) \tag{5}$$

$$\hat{E}_t=\Gamma(\hat{E}_{t-1}) \tag{6}$$

(III): $\Psi$, a final decoding step that maps the transformer embedding to the desired output representation. It may comprise a fully connected layer followed by a softmax layer that maps each element of $\hat{E}_t$ to a two dimensional vector $\hat{L}=\{0,1\}^N$, representing probabilities for each class (non-bold and bold respectively).

$$CONSENT(P)=\Psi(\Gamma(\Phi(p)))=\hat{L} \tag{7}$$

Now that all the components of the model are defined, an objective function may be defined to optimize the model's parameters. Traditionally, for this type of task a cross-entropy loss is used. However, given the fact that bold / non-bold use case deals with a class imbalance situation, focal loss may be used for this particular use case. This is a variation of the cross-entropy loss designed for situations when there is exists a class imbalance. In the bold/non-bold scenario, the loss function may be the following:

$$L_T(L, \hat{L})=-\Sigma_i((1-L_i^t)^\gamma \log(L_i^t)) \tag{8}$$

where $$L_i^t = \begin{Bmatrix} \hat{L}_i & \text{if } L_i = 1 \\ 1 - \hat{L}_i & \text{otherwise} \end{Bmatrix} \tag{9}$$

Attention can be described as computing alignments of different vectors so as to find relationships between them. Although there exists multiple ways of computing such alignments, the specific attention this model uses is scaled dot product attention. Formally, let Q, K and V define queries, keys and values. The goal is to match the input Q and K of dimension $d_k$ to the output V of dimension $d_v$. To compute the resulting weights of the values, the alignment of each query and key is calculated using dot product, a normalisation constant $\sqrt{d_k}$ and a final softmax function. The resulting weights are then multiplied with V.

$$Att(Q, K, V) = \text{softmax}\left(\frac{QK^T}{\sqrt{d_k}}\right)V \tag{10}$$

In the anomalous text use case, Q, K and V are all equal, therefore self-attention is used.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

receiving a product label comprising an image of a plurality of words;

generating, using optical character recognition (OCR), an image of a first word of the plurality of words;

generating a latent representation of the first word using a variational autoencoder;

determining, by a classifier based on the latent representation, a score indicating a likelihood that the image of the first word represents bolded, italicized, or highlighted text relative to at least some other words of the plurality of words;

training the variational autoencoder and the classifier using back propagation of reconstruction loss and classification loss;

determining that the first word represents an allergen by comparing the first word to a list of allergens;

determining, based at least in part on the score, that the first word is not bolded; and preventing a product associated with the product label from being listed on an e-commerce site based at least in part on the first word not being bolded.

2. The method of claim 1, further comprising:

obtaining a set of scores for the plurality of words from the classifier, wherein each score represents a respective likelihood that the image of the respective word represents bold, italicized, or highlighted text relative to the some other words of the plurality of words;

determining a mean and standard deviation of the set of scores;

determining a subset of scores that are statistical outliers relative to other members of the set of scores; and generating output data indicating that images of words associated with the subset of scores are bold, italicized, or highlighted.

3. A method comprising:

receiving image data representing a plurality of words;

determining an image of a first word of the plurality of words;

generating, by a first machine learning model, a first feature representation of the first word, wherein the first machine learning model comprises a variational autoencoder or a transformer;

generating, by a classifier network a first score based at least in part on the first feature representation, wherein the classifier network is trained to determine the first score representing a likelihood that an appearance of the first word in the image of the first word has a different style attribute from at least some other words of the plurality of words based at least in part on the first feature representation of the first word, wherein the different style attribute is one or more of the following: bold, italics, or highlighting;

determining, based at least in part on the first score, that the first word is not bolded, italicized, or highlighted; and generating output data indicating that a first product associated with the image data cannot be listed on an e-commerce site.

4. The method of claim 3, further comprising:

generating, by the first machine learning model, a conditional distribution representing the image of the first word;

determining a mean of the conditional distribution;

inputting the mean of the conditional distribution into the classifier network; and outputting the first score from the classifier network.

5. The method of claim 3, further comprising:

generating a set of respective scores for each word of the plurality of words;

determining a mean score and standard deviation for the set; and determining a subset of scores that are outliers with respect to the other scores of the set based at least in part on the mean score and standard deviation.

6. The method of claim 5, further comprising:

determining a set of words of the plurality of words that are associated with the subset of scores; and generating second output data indicating that an appearance of each word of the set of words is emphasized in the plurality of words.

7. The method of claim 3, further comprising:

generating, by the first machine learning model, the first feature representation comprising a latent distribution representing the image of the first word;

sampling a point from the latent distribution;

generating, by a decoder network, a reconstruction data representing the image of the first word; and determining a reconstruction loss representing a difference between the reconstruction data and the image of the first word.

8. The method of claim 7, wherein the first machine learning model comprises the variational autoencoder, the method further comprising training the variational autoencoder based at least in part on the reconstruction loss.

9. The method of claim 3, wherein the first machine learning model comprises the variational autoencoder, the method further comprising:

generating the first feature representation using the variational autoencoder; and training the variational autoencoder and the classifier network together based at least in part on reconstruction loss and classifier loss.

10. The method of claim 3, wherein the first machine learning model comprises the variational autoencoder, the method further comprising:

sending first data from an intermediate layer of an encoder of the variational autoencoder to a layer of a decoder of the variational autoencoder, wherein the first feature representation is generated based at least in part on a reconstruction loss determined using the first data.

11. The method of claim 3, further comprising:

generating a second feature representation of the first word, the second feature representation representing a relationship between a first height of the first word, in pixels, and a first length of the first word, in pixels; and sending the second feature representation to the classifier network, wherein the first score is further generated based at least in part on the second feature representation.

12. A system comprising:

at least one processor; and non-transitory computer-readable memory storing instructions that, when executed by the at least one processor, are effective to:

receive image data representing a plurality of words;

determine an image of a first word of the plurality of words;

generate, by a first machine learning model, a first feature representation of the first word, wherein the first machine learning model comprises a variational autoencoder or a transformer;

generate, by a classifier network a first score based at least in part on the first feature representation, wherein the classifier network is trained to determine the first score representing a likelihood that an appearance of the first word in the image of the first word has a different style attribute from at least some other words of the plurality of words based at least in part on the first feature representation of the first word, wherein the different style attribute is one or more of the following: bold, italics, or highlighting;

determine, based at least in part on the first score, that the first word is not bolded, italicized, or highlighted; and generate output data indicating that a first product associated with the image data cannot be listed on an e-commerce site.

13. The system of claim 12, the non-transitory computer-readable memory storing further instructions that, when executed by the at least one processor, are further effective to:

generate, by the first machine learning model, a conditional distribution representing the image of the first word;

determine a mean of the conditional distribution;

input the mean of the conditional distribution into the classifier network; and output the first score from the classifier network.

14. The system of claim 12, the non-transitory computer-readable memory storing further instructions that, when executed by the at least one processor, are further effective to:

generate a set of respective scores for each word of the plurality of words;

determine a mean score and standard deviation for the set; and determine a subset of scores that are outliers with respect to the other scores of the set based at least in part on the mean score and standard deviation.

15. The system of claim 14, the non-transitory computer-readable memory storing further instructions that, when executed by the at least one processor, are further effective to:

determine a set of words of the plurality of words that are associated with the subset of scores; and generate second output data indicating that an appearance of each word of the set of words is emphasized in the plurality of words.

16. The system of claim 12, the non-transitory computer-readable memory storing further instructions that, when executed by the at least one processor, are further effective to:

generate, the first machine learning model, the first feature representation comprising a latent distribution representing the image of the first word;

sample a point from the latent distribution;

generate, by a decoder network, a reconstruction data representing the image of the first word; and determine a reconstruction loss representing a difference between the reconstruction data and the image of the first word.

17. The system of claim 16, wherein the first machine learning model comprises the variational autoencoder, and wherein the non-transitory computer-readable memory stores storing further instructions that, when executed by the at least one processor, are further effective to train the variational autoencoder based at least in part on the reconstruction loss.

18. The system of claim 12, the non-transitory computer-readable memory storing further instructions that, when executed by the at least one processor, are further effective to:

determine that the image of the first word is anomalous with respect to the at least some other words of the plurality of words based at least in part on the first score;

determine ground truth data indicating whether the image of the first word is anomalous; and train the classifier network using a training instance comprising the first feature representation and the ground truth data, wherein the classifier network receives the first feature representation of the first word as an input and outputs the first score.

* * * * *